United States Patent [19]

Cappel et al.

[11] Patent Number: 4,969,775
[45] Date of Patent: Nov. 13, 1990

[54] PROCESS OF DRESSING CONTAMINATED SOILS

[75] Inventors: Fred Cappel, Dreieich; Dirk Hankel, Muhlheim; Heinrich Meiler, Hofheim; Friedrich Rosenstock, Frankfurt am Main, all of Fed. Rep. of Germany

[73] Assignee: Metallgesellschaft AG, Frankfurt am Main, Fed. Rep. of Germany

[21] Appl. No.: 260,559

[22] Filed: Oct. 20, 1988

[30] Foreign Application Priority Data

Oct. 22, 1987 [DE] Fed. Rep. of Germany ....... 3735788
May 6, 1988 [DE] Fed. Rep. of Germany ....... 3815461

[51] Int. Cl.⁵ .............................. B08B 3/10; B08B 3/04
[52] U.S. Cl. ..................................... 405/128; 210/259; 210/767; 210/768; 210/806; 210/908
[58] Field of Search ................ 405/128, 129; 210/202, 210/259, 768, 767, 770, 805, 806, 908–910; 110/346

[56] References Cited

U.S. PATENT DOCUMENTS

| | | | |
|---|---|---|---|
| 3,888,193 | 6/1975 | Nishigami et al. | 110/346 X |
| 4,244,531 | 1/1981 | Szegvari | 241/172 |
| 4,253,408 | 3/1981 | Kramer | 110/346 |
| 4,424,081 | 1/1984 | Giguere | 134/10 |
| 4,606,774 | 8/1986 | Morris | 134/10 |
| 4,675,902 | 8/1988 | Ely et al. | 210/610 |
| 4,783,263 | 11/1988 | Trost et al. | 210/638 |
| 4,801,384 | 1/1989 | Steiner | 210/634 |

OTHER PUBLICATIONS

"Initial Testing of Pilot Scale Equipment for Soil Decontamination", U.S. D.O.E. RFP-3022, 10/17/80.

Primary Examiner—Randolph A. Reese
Assistant Examiner—John Ricci
Attorney, Agent, or Firm—Sprung Horn Kramer & Woods

[57] ABSTRACT

For a separation into a purified fraction and a pollutant concentrate, contaminated soils are ground in a drum to which loose pieces acting like grinding elements have been added and with a net energy input of 4 to 16 kWh per 1000 kg throughput. The speed is 50 to 90% of the critical speed $$n_{crit} = \frac{42.4}{\sqrt{D}} \; (\min^{-1}).$$

The suspension discharged from the drum is separated by sieving into a relatively coarse fraction and a relatively fine fraction. The relatively coarse fraction is discharged as a purified fraction and the relatively fine fraction is desludged. The separated sludge is dewatered and is subsequently delivered as a pollutant concentrate. The desludged remainder of the finer fraction is dewatered and is subsequently delivered as purified soil.

19 Claims, 2 Drawing Sheets

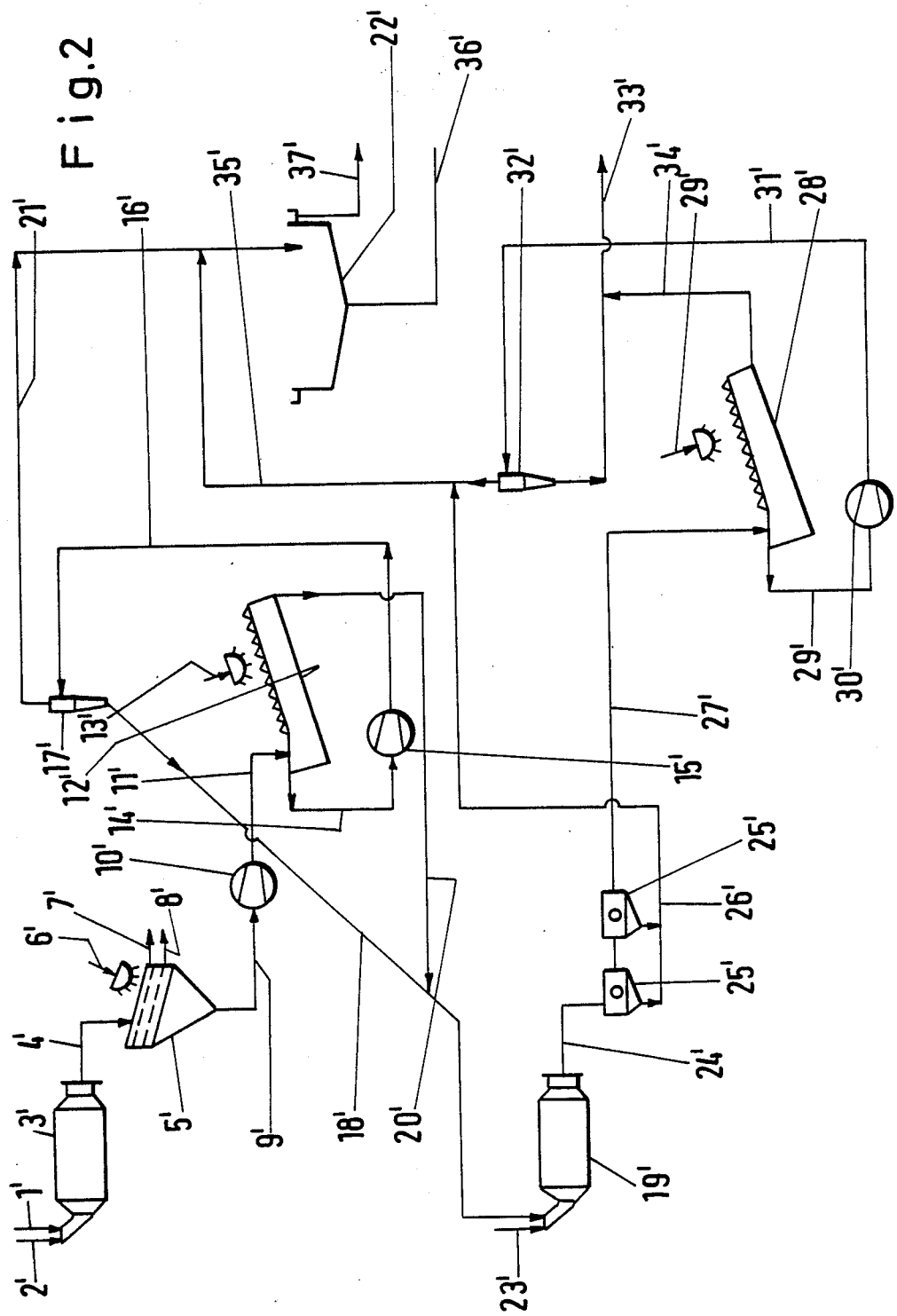

PROCESS OF DRESSING CONTAMINATED SOILS

BACKGROUND OF THE INVENTION

This invention relates to a process of dressing contaminated soils, which as an aqueous slurry are agitated in a drum, whereafter the effluent from the drum is separated into relatively coarse and relatively fine fractions.

The decontamination of soils or dumps which have been contaminated by hydrocarbons, oils or heavy metals is highly expensive. For this reason it has been proposed to separate such soils by dressing into a fraction which is not contaminated or only slightly contaminated and into a fraction in which a major part of the polluants is concentrated. That fraction can then be decontaminated by methods which are simpler and much less expensive.

From J. E. Garnett, D. L. Mitchell, P. T. Faccini "Initial Testing of Pilot Equipment for Soil Decontamination", REP-3022, TIC-4500, DE-AC 04-76D P03 533, U.S. Department of Energy, Oct. 17, 1980, it is known to subject soils which are contaminated with plutoniumladen oil by wet dressing. The plutonium is associated with the fine-grained particles of the soil, which are separated from the coarser particles. The soil is first treated in a drum washer, in which dry aggregates are broken up and oil is removed by washing from gravel and coarse sand. Washing is effected with an aqueous NaOH solution at pH 11. The drum is provided with small blades for an improved agitation of the slurry. At its discharge end, the drum is provided with a sieve, which retains about 50% as an oversize above 4 mm. The undersize is sieved on a sieve which has a sieve cut of 0.5 mm and on which the +0.5-mm fraction is retained. The −0.5-mm fraction is subjected to hydrocyclonic and centrifugal separation into a +0.05-mm fraction and a −0.05-mm fraction. The −0.05-mm fraction is flocculated and centrifugated for effecting a separation into solids and washing liquor. The latter is recycled to the drum washer and the sieves. But that process has not effected a satisfactory decontamination of the soil.

SUMMARY OF THE INVENTION

It is an object of the invention to dress contaminated soils or dumps as economically as possible and in such a manner that the largest possible amount of a product is obtained which can be re-used or can safely be dumped whereas the polluants are concentrated in a remaining part which is as small as possible.

In accordance with the invention that object can be accomplished in that the contaminated soils are treated in a drum to which loose pieces acting like grinding elements have been added and with a net energy input between 4 and 16 kWh per 1000 kg of throughput, the speed of the drum is 50 to 90% of the critical speed $$n_{crit} = \frac{42.4}{\sqrt{D}} \; (\text{min}^{-1}),$$

the aqueous slurry discharged from the drum is separated by sieving into a relatively coarse fraction and a relatively fine fraction, the relatively coarse fraction is delivered as a purified fraction, the relatively fine fraction is desludged, the separated sludge is dewatered and is subsequently delivered as polluant concentrate and the desludged remainder of the relatively fine fraction is dewatered and subsequently delivered as purified soil. The term "soil" covers all materials which can be dressed by the process: e.g., it covers also dumps. In dependence on their nature, the soils are passed through a scrap and stone separator before they enter the drum. The upper size limit of the feed material is about 200 mm. The net energy input to the drum is the energy that is transmitted to the shell of the drum, i.e., the energy input to the filled drum minus the energy input to the empty drum. The net energy input is related to the throughput of dry soil. In the range in accordance with the invention the optimum energy input will depend on the nature of the soil and the nature of the impurities and will be empirically determined. The lower limit of the energy input preferably exceeds a lower limit of 6 kWH/1000 kg because better results will generally be obtained in that case, "D" is the diameter of the drum in meters. In the drum the soil is treated in such a manner that the surfaces of the particles are subjected to strong abrasion. The energy input which is required for that purpose will necessarily effect also a certain reduction in size. The sieve cut to be selected will also depend on the nature of the soil and the nature of the impurities and will be empirically determined. The aqueous medium in the drum generally consists of water, preferably of water which has been recycled from succeeding stages of the process. Sieving is suitably effected on a vibrating sieve, which is sprinkled with recycled water and/or fresh water. The vibrating sieve may be relieved from coarse particles in that the latter are sieved off before, e.g., on a sieve basket mounted at the discharge end of the drum. Before the removal of sludge from the relatively fine fraction, ferromagnetic particles can be removed from said fraction by magnetic separation. Hydrocyclones are particularly suitable for a desludging of the relatively fine fraction which has been sieved off. The underflow of the hydrocyclone is re-washed before it is delivered as purified soil. This may be effected, e.g., in a spiral classifier, in which fresh water is sprayed. The overflow of the hydrocyclone contains the sludge and may be dewatered by means of thickeners, centrifuges or filters. The aqueous liquors which are collected by the dewatering treatments are recycled to the drum and optionally to the sieves. A part of the aqueous liquors is delivered to a sewage treating plant. If the impurities in the soil consist only or mainly of heavy metals, a purified soil and a polluant concentrate can be recovered in that manner without a need for a further treatment of the sludge suspension before it is dewatered. About 5 to 15% of the material subjected to sieving will be recovered as pure soil. A sludge having a particle size below about 0.063 mm is recovered by the desludging treatment at a rate of about 5 to 15% of the material subjected to desludging. The degree of purification can be influenced by the degree of desludging.

In accordance with the invention the object set forth can also be accomplished in that the contaminated soils are treated in a first drum to which loose pieces acting like grinding elements have been added and with a net energy input between 1 and 6 kWh per 1000 kg of throughput, the speed of the drum is 50 to 90% of the critical speed $$n_{crit} = \frac{42.4}{\sqrt{D}} \text{ (min}^{-1}\text{),}$$

the aqueous slurry discharged from the drum is separated by sieving into a relatively coarse fraction and a relatively fine fraction, the relatively coarse fraction is delivered as a purified fraction, the relatively fine fraction is desludged, the separated sludge is dewatered and is subsequently delivered as pollutant concentrate, the desludged remainder of the relatively fine fraction is treated in a drum to which loose pieces acting like grinding elements have been added and with a net energy input between 4 and 16 kWh per 1000 kg of throughput, the speed of the drum is 50 to 90% of the critical speed $$n_{crit} = \frac{42.4}{\sqrt{D}} \text{ (min}^{-1}\text{),}$$

the aqueous slurry discharged from the second drum is desludged, the separated sludge is dewatered and is subsequently delivered as a pollutant concentrate and the desludged second remainder of the relatively fine fraction is dewatered and is subsequently delivered as a purified soil. With the exception of the data relating to the net energy input to the first drum and the rate at which sludge is recovered by desludging, the remarks made in connection with the processing described before are applicable also to the processing now described. The net energy input to the first drum is preferably 1 to 4 kWh/1000 kg.

In accordance with a preferred feature the speed of the drum is 60 to 80% of the critical speed. The treatment in the drum rotating at that speed will result in a particularly good purification.

In accordance with a preferred feature, sieving is effected at a sieve cut of about 1 to 2 mm. In many cases, a sieving at that sieve cut will result in a good separation into purified soil and pollutant concentrate.

In accordance with a preferred feature, the desludged remainder of the relatively fine fraction is subjected to flotation, the froth product is delivered as a pollutant concentrate and the underflow is dewatered and is subsequently delivered as purified soil. Where two drums are connected in series, the desludged remainder of the relatively fine fraction from the first drum will be subjected to flotation when it has been treated in the second drum and is contained in the second aqueous slurry which has been discharged from the second drum. The froth product obtained by the flotation is dewatered and is subsequently delivered as a pollutant concentrate. The underflow obtained by the flotation is desludged, the sludge separated from the underflow is dewatered and is subsequently delivered as a pollutant concentrate, and the desludged remainder of the underflow is delivered as purified soil. Desludging of the underflow obtained by the flotation is suitably also effected by a spiral classifier, which is succeeded by a hydrocyclone. The sludge which has been collected in the hydrocyclone is fed to the thickener. That processing will particularly be used with soils which contain hydrocarbons and/or oil and will cause also heavy metals to be collected in the pollutant concentrate. Flotation agents which may be employed include collectors, such as oil acids, oil acid derivatives, diesel oil, amines and others. In spite of the addition of oil, a purified soil will be obtained which is free of oil or contains only very small amounts of oil.

The underflow and the overflow obtained by the flotation are suitably dewatered first in thickeners, and the underflows from said thickeners are separately dewatered in centrifuges and filters.

In accordance with a preferred feature the pieces consist of steel balls and the steel balls when at rest occupy up to 40% of the cubic capacity of the drum. Good results will be obtained if the pieces when at rest occupy the cubic capacity to that degree. Depending on the material to be processed the lower limit for the volume of the pieces should not be less than 5%.

In accordance with a preferred feature 55 to 65% of the steel balls are about 20 to 30 mm in diameter and 45 to 35% of the steel balls have a diameter above 30 mm and below 100 mm in diameter. Good results will be obtained with these size relations.

In accordance with a preferred feature, the material used for the pieces consists of a lump material of the same kind as the soil and/or of a natural and/or artificial lump material of a kind different from the soil and the lump material when in a state of rest occupies up to 60% of the cubic capacity of the drum. It is desirable to use a coarse material which is of the same kind as the soil and which is sieved from the soil before the latter is fed to the drum. The lower limit of the volume of that material used in the drum should not be less than 5% of the cubic capacity of the drum. Because the lump material is lighter in weight than steel balls, it will be necessary to maintain in the drum a lower slurry level than where steel balls are used in order to ensure that the necessary energy will be transmitted by the lump material.

In accordance with a preferred feature the lump material has a lump size between 60 and 200 mm. Good results will be obtained with that lump size.

In accordance with a preferred feature the drum is provided at its discharge end with a grate and with discharge blades for controlling the level of the slurry in the drum. In that case it will be simple to maintain a low slurry level in the drum.

In accordance with a preferred feature, steel balls and lump material are used as pieces. In that case, a material of the same kind as the soil can be used as pieces and the steel balls will transmit energy at a higher rate.

In accordance with a preferred feature, the addition of the pieces into the drum is controlled to maintain a constant energy input to the drum. That mode of operation will permit constant purification results to be achieved in a simple manner.

In accordance with a further feature, the purified soil is redressed in a second treating stage. This will result in a more intense purification.

In accordance with a further feature the net energy input to the drum in the second treating stage is controlled to exceed the net energy input to the drum in the first treating stage. The net energy input to the first treating stage is so selected that a higher net energy input in the stated range can be effected in the second treating stage. This will result in a very good purification and the higher energy input will be required only for a smaller part of the material.

In accordance with a preferred feature, the aqueous slurry discharged from the drum is separated by sieving into a relatively coarse fraction having a relatively large particle size, a relatively course fraction having a relatively small particle size, and a relatively fine fraction. Sieving is preferably effected with sieve cuts of about 1 mm and of about 6 mm. Some soils contain woodlike particles which have a high content of oillike residues. Said particles may be separated in the relatively coarse fraction having a relatively small particle size and can separately be dressed, e.g., in that they are fed to the second drum.

In accordance with a particularly preferred feature the solids fed to the drum contain 5 to 40% by weight of particles smaller than 60 μm. Surprisingly it has been found that the residual polluant content of the purified fraction will be particularly low in this case. The fines may consist of the same contaminated soil substance and may possibly be produced by a previous grinding, or other fine-grained substances may be added, such as limestone, sand, marl, clay, waste coal, spent activated carbon and washed tailings from flotation treatments. If substances such as coal, waste coal or spent activated carbon are added, they will preferably be added in an amount of 5 to 20%. If other substances, such as limestone, sand, etc. are added, they will preferably be added in an amount of 15 to 30%. If the soil is treated in two drums, which are connected in series, the fines may be fed to the first drum or to the second drum or partly to the first drum and partly to the second drum. In any case it will be preferable to feed part of the fines to the second drum because the latter does not contain fines or contains only a small amount of fines. The fines fed to the second drum should not be contaminated because a poorer purification would otherwise be effected.

In accordance with a further particularly preferred embodiment, fine-grained mineral substances containing at least one compound of the group $SiO_2$, $Al_2O_3$, CaO and MgO are added to adjust the content of fines below 60 μm and the rate and composition of the fine-grained substances which are added are so selected that a polluant concentrate will be obtained which is adapted to be converted by a thermal treatment to a slag phase having a desired composition. In that case a good purification can be achieved and a slag can be obtained which has a composition that is desirable for the further processing of the polluant concentrate.

In accordance with a further particularly preferred feature, the polluant concentrate is thermally treated in a rotary kiln and is thus converted to a pasty to liquid slag phase and the composition of the feed polluant concentrate is so selected that the resulting slag phase comprises a matrix consisting of 60 to 72% $SiO_2$, 10 to 30% $Al_2O_3$ and 5 to 25% CaO+MgO as main constituents, the sum of % $SiO_2$+% $Al_2O_3$+% CaO+% Mg=100, the main constituents $SiO_2$, $Al_2O_3$, CaO and MgO total at least 60% of the dry and ignition loss-free polluant concentrate that is fed to the rotary kiln, and the discharged slag phase is cooled and the exhaust gas from the rotary kiln is purified. A processing of contaminated mineral substances by a thermal treatment in a rotary kiln under these conditions is a subject matter of German Application P 37 18 669.8. An effective purification of the relatively coarse fraction can be achieved by that processing at the same time. Besides, the rate at which material is to be processed in the rotary kiln will substantially be decreased, the polluants contained in the polluant concentrate will be converted in part to harmless substances by combustion, and the remaining polluants will be enclosed and immobilized in the slag phase which is formed in such a manner that the slag can be dumped without difficulty or may be used for various purposes, such as land filling, road and dam building, mine fillings, etc.

In accordance with a preferred feature microorganism are added to the purified soil. Microbes and bacteria which have been added to the purified soil may decompose residual traces or organic polluants, such as hydrocarbons. To that end, the microorganisms or substrates impregnated with microorganisms may be added at the end of the last spiral classifier on a filter for dewatering the purified soil or during a possible intermediate storage of the purified soil or as the soil is placed on a site of use. In that case, nutrients for the microorganisms may be added to the dressed soil which is moist and well aerated in any case so that a maximum afterpurification effect will be ensured even through a long time.

The invention will be explained more in detail with reference to the drawings.

BRIEF DESCRIPTION OF THE DRAWING

FIG. 2 illustrates a two-stage treatment in two drums, which are connected in series.
FIG. 1:

DETAILED DESCRIPTION OF THE INVENTION

Figure 1:
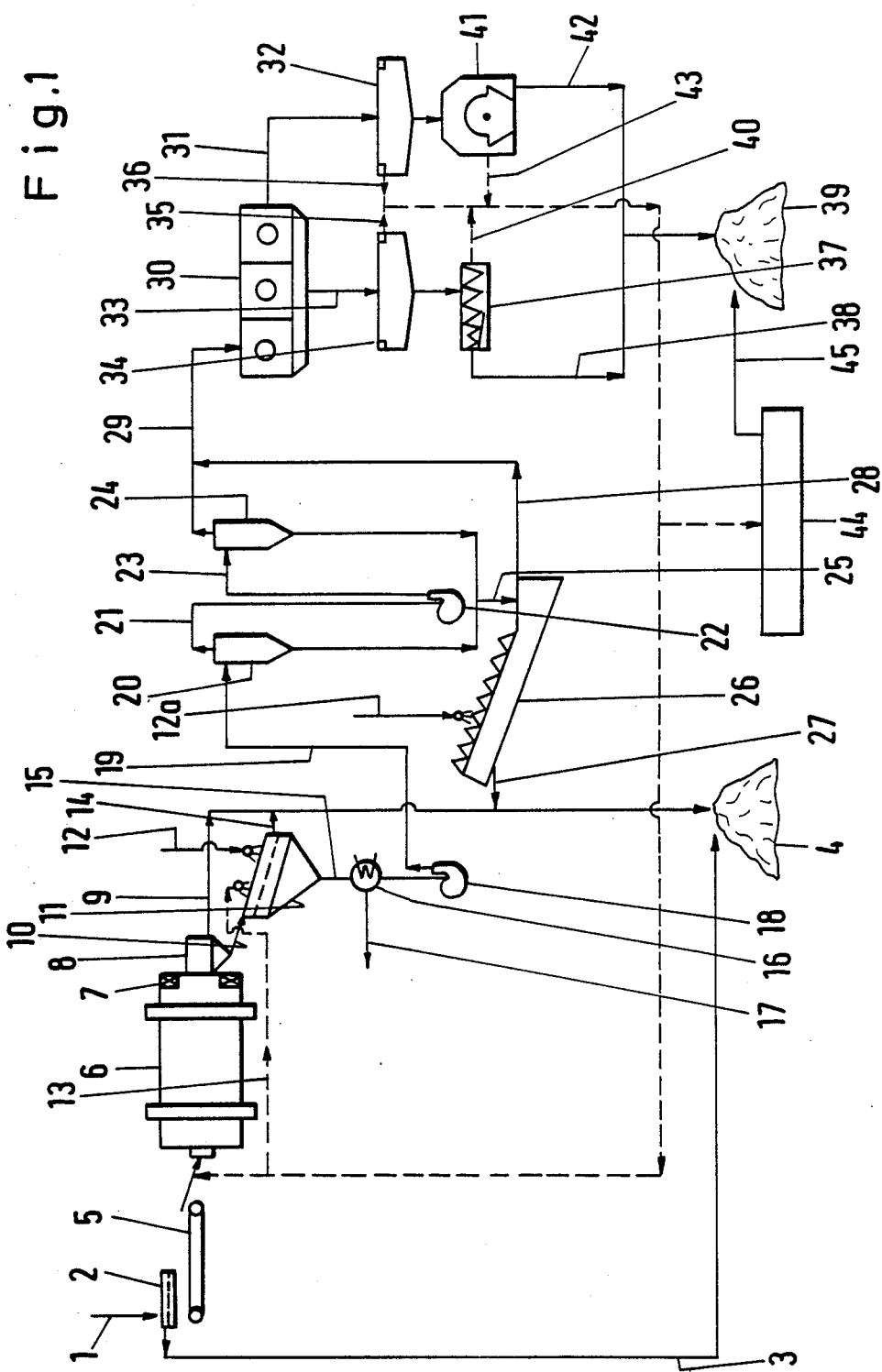
FIG. 1 illustrates a single-stage treatment in a drum.

In FIG. 1, stones and scrap are removed from the contaminated soil 1 on the sieve 2. The stones 3 are delivered as decontaminated soil 4. The remaining contaminated soil is charged by the belt weigher 5 into the drum 6, which at its discharge end is provided with discharge blades 7 and with a sieve basket 8. Coarse particles pass through the sieve basket 8 and are delivered via 9 as decontaminated soil 4. The slurry which has been discharged passes through the sieve basket 8 and is delivered via 10 to the vibrating sieve 11, where it is sprinkled with fresh water 12 and recycled water 13. The relatively coarse fraction is delivered via 14 as decontaminated soil 4. The relatively fine fraction is fed via 15 to the magnetic separator 16, where ferrous scrap is removed and is delivered via 17. The pump 18 feeds the relatively fine fraction via 19 to the first hydrocyclone 20, from which the overflow is passed via 21, the pump 22 and line 23 to the second hydrocyclone 24. The underflows from the two hydrocyclones are fed via 25 to the spiral classifier 26 and are sprinkled therein with fresh water 12a. The coarse fraction is delivered from the spiral classifier 26 via 27 as decontaminated soil 4. Together with the overflow from the second hydrocyclone 24 the suspension discharged via 28 is fed via 29 to the flotation plant 30. The froth product is fed via 31 to the thickener 32. The underflow is fed via 33 to the thickener 34. The overflows from the thickeners 32 and 34 are fed via 35 and 36 to the recycle line. The underflow from the thickener 34 is fed to the centrifuge 37, from which the solids 38 are discharged via 38 as a polluant concentrate 39 and the liquid is conducted via 40 to the recycle line. The underflow from the thickener 32 is fed to the hyperbaric filter 41, from which the solids are withdrawn via 42 as a polluant concentrate 39 and liquid is conducted via 43 to the recycle line. Part of the liquid conducted in the recycle line is fed to the sewage treating plant 44, another part to the drum 6 and a further part via 13 to the vibrating sieve 11. The residue from the sewage treating plant 44 is delivered via 45 as a polluant concentrate 39.

In FIG. 2, contaminated soil 1' and water 2' are charged to the drum 3'. The slurry discharged from the drum is fed via 4' to the double sieve 5' and is sprinkled there with water 6'. The relatively coarse fraction 7' having a particle size in excess of 6 mm is delivered as contaminated soil. The relatively coarse fraction 8' having a particle size below 6 mm and above 1 mm is separately dressed. The relatively fine fraction having a particle size below 1 mm is fed via 9', the pump 10' and line 11' to the spiral classifier 12' and is sprinkled with water 13' there. The sludge-containing suspension is fed via 14', pump 15' and line 16' to the hydrocyclone 17'. The underflow from the hydrocyclone is fed via 18' to the second drum 19'. The desludged remainder discharged from the spiral classifier is fed via 20' also to the second drum 19'. The sludge-containing suspension is fed from the hydrocyclone 17' via 21' to the thickener 22'. Water is fed via 23' to the second drum 19'. The slurry discharged from the second drum 19' is fed via 24' to the flotation plant 25' and is floated there after an addition of flotation reagents and detergents. The froth product is fed via 26' to the thickener 22'. The underflow from the flotation plant 25' is fed via 27' to the spiral classifier 28' and is sprinkled with water 29' there. The sludge-containing suspension is fed via 29', the pump 30' and the line 31' to the hydrocyclone 32'. The underflow is delivered via 33' as a decontaminated soil. The desludged remainder discharged from the spiral classifier 28' is delivered via 34' as purified soil. The sludge-containing suspension is fed from the hydrocyclone 32' via 35' to the thickener 22'. The dewatered polluant concentrate is withdrawn from the thickener 22' via 36'. The water that has been separated in the thickener is fed via 37' to the sewage treating plant.

EXAMPLES

Examples 1 to 4

Three different oil-contaminated soils were treated in accordance with the process scheme of FIG. 1 but without magnetic separation. The drum was filled with steel balls occupying at a state of rest 35% of the cubic capacity of the drum. Diesel oil was added for the flotation. The soils used in Examples 1 and 2 came from the same site but differ slightly in carbon contents. The quantities are stated in % by weight. The net energy input of the drum amounted to 4 kWh/1000 kg in Example 1 and to 8 kWh/1000 kg in all other Examples.

|  | | Share in % by weight | | |
|---|---|---|---|---|
| Fraction (mm) | | Ex. 1 | Ex. 3 | Ex. 4 |
| Above 0.315 | | 2.4 | 0.9 | 1.4 |
| 0.315–0.200 | | 15.9 | 5.1 | 5.4 |
| 0.200–0.125 | | 23.7 | 18.7 | 10.4 |
| 0.125–0.090 | | 14.5 | 22.0 | 16.5 |
| 0.090–0.063 | | 12.2 | 20.3 | 21.3 |
| 0.063–0.045 | | 7.6 | 13.0 | 15.0 |
| Below 0.045 | | 23.7 | 20.0 | 30.0 |

All purified soils still contained a large share of the particle size fraction below 0.063 mm

EXAMPLE 5

An oil-contaminated soil was treated in accordance with the process scheme shown in FIG. 2. The first drum was filled with stone pieces from the soil, which in a state of rest occupied 35% of the cubic capacity of the drum. The net energy input to the drum amounted to 2.5 kWh/1000 kg. The second drum was filled with steel balls, which in a state of rest occupied 35% of the cubic capacity of the drum. The net energy input to the second drum amounted to 5 kWh/1000 kg. Emulsified diesel oil was added as a collector for the flotation.

The relatively coarse fraction which had a particle size below 6 mm and above 1 mm was sieved off and fed to the second drum.

In the following table, the content of polluants which are soluble in petroleum ether (PES) is stated for each fraction.

|  | % by weight | PES % |
|---|---|---|
| Raw soil (1) | 100 | 0.81 |
| Fraction above 6 mm (7) | 5.2 | 0.03 |
| Fraction from 1 to 6 mm (8) | 6.6 | 1.68 |
| Sludge after 1st hydrocyclone (17) | 17.3 | 1.74 |
| Feed to flotation (24) | 70.9 | 0.15 |
| Froth from flotation (26) | 3.1 | 2.86 |
| Sludge from 2nd hydrocyclone (32) | 4.0 | 0.30 |
| Polluant concentrate (36) | 24.4 | 2.8 |
| Purified soil below 1 mm (33) | 63.8 | 0.02 |

|  | % | Content % | | | Distribution % | | |
|---|---|---|---|---|---|---|---|
|  |  | Oil | C | S | Oil | C | S |
| Example 1 | | | | | | | |
| Contaminated soil | 100 | 3.4 | 6.8 |  | 100 | 100 |  |
| Decontaminated soil | 67.8 | 0.96 | 2.1 | 0.17 | 19.1 | 21.9 |  |
| Polluant concentrate | 32.2 | 8.5 | 16.5 |  | 80.9 | 78.1 |  |
| Example 2 | | | | | | | |
| Contaminated soil | 100 | 3.4 | 6.2 | 0.40 | 100 | 100 |  |
| Decontaminated soil | 70.6 | 0.045 | 1.8 |  | 0.9 | 20.5 |  |
| Polluant concentrate | 29.4 | 11.4 | 16.7 |  | 99.1 | 79.5 |  |
| Example 3 | | | | | | | |
| Contaminated soil | 100 | 0.41 | 2.2 | 0.09 | 100 | 100 | 100 |
| Decontaminated soil | 90.4 | 0.044 | 0.45 | 0.04 | 9.8 | 18.6 | 40.0 |
| Polluant concentrate | 9.6 | 3.85 | 18.6 | 0.56 | 90.2 | 81.4 | 60.0 |
| Example 4 | | | | | | | |
| Contaminated soil | 100 | 0.67 | 8.9 | 0.17 | 100 | 100 | 100 |
| Decontaminated soil | 80 | 0.16 | 2.0 | 0.08 | 19.1 | 18.0 | 37.4 |
| Polluant concentrate | 20 | 2.7 | 36.5 | 0.54 | 80.9 | 82.0 | 62.6 |

The sieve analyses of the decontaminated soils were as follows:

25% of the raw soil had a particle size below 0.06 mm.

When 5% limestone were added to the desludged fraction fed to the second drum, the purified soil 33 contained 0.017% PES.

The advantages afforded by the invention reside in that a large part of the impurities can be highly enriched in a small part of the soils and that the decontaminated soils can be re-used. As a result, the economy of the decontamination of the entire soil is substantially improved and a large part can be re-used. There is no upper limit to the permissible content of the very fine fraction below 0.063 mm in the contaminated soils and even high clay contents will not give rise to difficulties in dewatering.

What is claimed is:

1. In a process of dressing contaminated soils, including agitating in a drum the contaminated soils as an aqueous slurry consisting essentially of the soil and water, and thereafter separating effluent from the drum into relatively coarse and relatively fine fractions, the improvement comprising treating the contaminated soils in the drum by adding loose pieces acting like grinding elements, operating the drum with a net energy input between 4 and 16 kWh per 1000 kg of throughput, and rotating the drum with a speed which is 50 to 90% of the critical speed $$n_{crit} = \frac{42.4}{\sqrt{D}} \text{ (min}^{-1}\text{)},$$

discharging the aqueous slurry from the drum, separating by seiving into the relatively coarse fraction and the relatively fine fracion, delivering the relatively coarse fraction as a purified fraction, desludging the relatively fine fraction, dewatering the separated sludge and subsequently delivering same as pollutant concentrate and dewatering the desludged remainder of the relatively fine fraction and subsequently delivering same as purified soil.

2. In a process of dressing contaminated soils, including agitating in a drum the soil as an aqueous slurry consisting essentially of the soil and water, and thereafter separating effluent from the drum into relatively coarse and relatively fine fractions, the improvement comprising treating the contaminated soils in a first drum by adding loose pieces acting like grinding elements with a net energy input between 1 and 6 KWh per 1000 kg of throughput, and rotating the first drum at a speed which is 50 to 90% of the critical speed $$n_{crit} = \frac{42.4}{\sqrt{D}} \text{ (min}^{-1}\text{)},$$

discharging the aqueous slurry from the first drum, separating the slurry by sieving into a relatively coarse fraction and a relatively fine fraction, delivering the relatively coarse fraction as a purified fraction, desludging the relatively fine fraction, dewatering the separated sludge and subsequently delivering same as pollutant concentrate, treating the desludging remainder of the relatively fine fraction in a second drum by adding loose pieces acting like grinding elements with a net energy input between 4 and 16 kWh per 1000 kg of throughput, rotating the second drum at a speed which is 50 to 90% of the critical speed $$n_{crit} = \frac{42.4}{\sqrt{D}} \text{ (min}^{-1}\text{)},$$

desludging the aqueous slurry from the second drum, dewatering the separated sludge and subsequently delivering same as a pollutant concentrate and dewatering the desludged second remainder of the relatively fine fraction and subsequently delivering same as purified soil.

3. A process according to claim 1 or 2, wherein the speeds of the drums are 60 to 80% of their critical speed.

4. A process according to claim 3, wherein sieving is effected with a sieve cut of about 1 to 2 mm.

5. A process according to claim 1 or 2, wherein the desludged remainder of the relatively fine fraction is subjected to flotation thereby producing a froth fraction and an underflow, the froth product is delivered as a pollutant concentrate and the underflow is dewatered and is subsequently delivered as purified soil.

6. A process according to claim 1 or 2, wherein the pieces consist of steel balls and the steel balls when at rest occupy up to 40% of the cubic capacity of the drum.

7. A process according to claim 6, wherein 55 to 65% of the steel balls are about 20 to 30 mm in diameter and 45 to 35% of the steel balls have a diameter above 30 mm and below 100 mm in diameter.

8. A process according to claim 1 or 2, wherein the material used for the pieces consists of a lump material and the lump material when in a state of rest occupies up to 60% of the cubic capacity of the drum.

9. A process according to claim 8, wherein the lump material has a lump size between 60 and 200 mm.

10. A process according to claim 8, wherein the drum is provided at its discharge end with a grate and with discharge blades for controlling the level of the slurry in the drum.

11. A process according to claim 1 or 2, wherein the pieces consist of steel balls and of lump material.

12. A process according to claim 1 or 2, wherein the addition of the pieces into the drum is controlled to maintain a constant energy input to the drum.

13. A process according to claim 1, wherein the purified soil is retreated in a second treating stage.

14. A process according to claim 13, wherein the net energy input to the drum in the second treating stage is controlled to exceed the net energy input to the drum in the first treating stage.

15. A process according to claim 1 or 2, wherein the aqueous slurry discharged from the drum is separated by sieving into a relatively coarse fraction having a relatively large particle size, a relatively coarse fraction having a relatively small particle size, and the relatively fine fraction.

16. A process according to claim 1 or 2, wherein solids fed to the drum contain 5 to 40% by weight of particles smaller than 60 μm.

17. A process according to claim 16, wherein fine-grained mineral substances containing at least one compound of the group $SiO_2$, $Al_2O_3$, $CaO$ and $MgO$ are added to adjust the content of fines below 60 μm, and the rate and composition of the fine-grained substances which are added are so selected that a pollutant concentrate will be obtained which is adapted to be converted by a thermal treatment to a slag phase having a desired composition.

18. A process according to claim 17, wherein the pollutant concentrate is thermally treated in a rotary kiln and is converted to a pasty to liquid slag phase and the composition of the feed pollutant concentrate is so selected that the resulting slag phase comprises a matrix consisting of 60 to 72% $SiO_2$, 10 to 30% $Al_2O_3$ and 5 to 25% CaO+MgO as main constituents, the sum of % $SiO_2$+% $Al_2O_3$, CaO and MgO total at least 60% of the dry and ignition loss-free pollutant concentrate that is fed to the rotary kiln, and the discharged slag phase is cooled and the exhaust gas from the rotary kiln is purified.

19. A process according to claim 1 or 2, wherein microorganisms are added to the purified soil.

* * * * *